United States Patent [19]

Gaffney

[11] Patent Number: 4,539,638
[45] Date of Patent: Sep. 3, 1985

[54] COMMAND LANGUAGE SYSTEM FOR INTERACTIVE COMPUTER

[75] Inventor: John Gaffney, Los Gatos, Calif.

[73] Assignee: Evans & Sutherland Computer Corp., Salt Lake City, Utah

[21] Appl. No.: 305,239

[22] Filed: Sep. 24, 1981

Related U.S. Application Data

[63] Continuation of Ser. No. 000,845, Jan. 4, 1979.

[51] Int. Cl.³ .............................................. G06F 9/00
[52] U.S. Cl. ................................................. 364/300
[58] Field of Search ... 364/200 MS File, 900 MS File

[56] References Cited

U.S. PATENT DOCUMENTS

| | | | |
|---|---|---|---|
| 3,422,419 | 1/1969 | Mathews et al. | 340/736 |
| 3,534,338 | 10/1978 | Christensen et al. | 364/200 |
| 4,120,028 | 10/1978 | Membrino et al. | 364/200 |

*Primary Examiner*—Raulfe B. Zache
*Assistant Examiner*—John G. Mills
*Attorney, Agent, or Firm*—Nilsson, Robbins, Dalgarn, Berliner, Carson & Wurst

[57] ABSTRACT

A command language system is disclosed wherein memory stacks register specific definitions for generic names, which definitions are appropriately selected in timely response to a name, on the basis of stack arrangement. A structure is included for searching the stack in order and detecting the first definition for a name of current interest. Thus, the stack is used to define the order of the name searching. As a consequence, in the interpretation of command languages, the user is given control over the context in which the names are executed. Specifically, a command program wil behave according to the definitions of the commands in a current context. The system further includes structure for deleting definitions from the stack which have been used and for sensing the bottom of the stack as a function of control.

4 Claims, 2 Drawing Figures

COMMAND LANGUAGE SYSTEM FOR INTERACTIVE COMPUTER

This is a continuation of application Ser. No. 000,845, filed Jan. 4, 1979.

BACKGROUND AND SUMMARY OF THE INVENTION

In general, interactive computers involve structures which participate in a so-called "conversation" with the user. Essentially, the user and the computer can interact with each other in a fashion that is particularly effective for certain applications as in the case of computer graphics.

In the operation of an interactive computer, the user is be provided with a set of commands for controlling the program of operation. Such a system is disclosed in U.S. Pat. No. 3,534,338, issued Oct. 13, 1970, to C. Christensen et al. The commands control the individual processes that are activated and also contain the data that is to be employed in the processes. In general, it is advisable to precisely define the range of commands which are acceptable to the computer and to define the form or syntax of each command. In that manner, the user has an established list of commands to which the computer will respond. Thus, communication with the computer is by the mechanism of a command language. For example, in the use of an interactive computer graphics system, the user addresses the computer with specific commands and the computer responds with displayed pictures and printed messages. Thus, a "conversation" is conducted.

Command languages tend to be quite different from the procedural languages used for writing computer programs, e.g. see Column 27 of the above-referenced Christensen patent. They differ both in appearance and implementation. Generally, command languages are simpler and do not define the type of commands that are compiled as to create a stored program. Rather, in the operation of an interactive computer, a current command is interpreted by the system to provide a definition (normally in the form of an instruction) then the current command is discarded. In the past, structures have been variously embodied for interpreting the individual commands of a command language. Such systems are treated in detail in a book, *Principles of Interactive Computer Graphics*, by W. N. Newman and R. F. Sproull, published by McGraw-Hill, Inc. in 1973.

Recapitulating to some extent, in the operation of an interactive computer, when a program containing commands is interpretively executed, each name that is encountered must be defined. That action involves resort to a dictionary. However, such commands as "compute" or "display" may involve a multitude of specific possibilities with the result that traditional command languages have necessitated a large number of specific commands involving such words as, for example, "compute hypotenuse of lines L1 and L2". The result has been to complicate the command language, increasing the difficulty of its use. In general, the present invention incorporates a command language system which allows generic programs to be written using such ambiguous commands as "compute" or "display", the ambiguity of which is automatically resolved and the commands properly executed in a context appropriate to the particular application. The ambiguity is resolved by a memory stack containing definitions and operated to provide the definitions in a predetermined sequence which is associated with the program.

In the operation of the present system, when a program containing commands is interpretively executed, each name (identification of a command or part of a command) that is encountered is looked up in the dictionaries on the dictionary stack by starting at the top of the stack and searching each dictionary encountered for the definition desired. For a detailed explanation, of such a well known operation, see the book Interactive Computer Graphics, 1978, by Wolfgang K. Giloi, pages 52–57. In accordance herewith, the search continues until the definition for the name is located or the bottom of the stack is reached. The structure allows different dictionaries to carry the same name and resolves the potential ambiguity by giving dictionaries a priority defined by position in the stack. The dictionary defining the name of interest that is first encountered (closest to the top) takes priority and is used in response to the name in question. If the stack does not contain a definition of the name, the structure senses the bottom of the stack and implements appropriate control.

BRIEF DESCRIPTION OF THE DRAWINGS

In the drawings, which constitute a part of this specification, an exemplary embodiment, demonstrating the various objectives and features hereof, is set forth as follows.

DESCRIPTION OF THE ILLUSTRATIVE EMBODIMENT

As indicated above, a detailed illustrative embodiment of the present invention is disclosed herein. However, command language structures in accordance with the present invention may be embodied in a variety of forms, some of which may be detailed quite differently from the disclosed embodiment. Specifically, command languages as known in the prior art of computer graphics are treated in the above-referenced book by Giloi, beginning at page 309 and relating such languages to specific implementations. Consequently, the specific structural and functional details disclosed herein are merely representative, yet in that regard they are deemed to provide the best embodiment for purposes of disclosure and to provide the basis for the claims herein which define the scope of the present invention.

Figure 1:
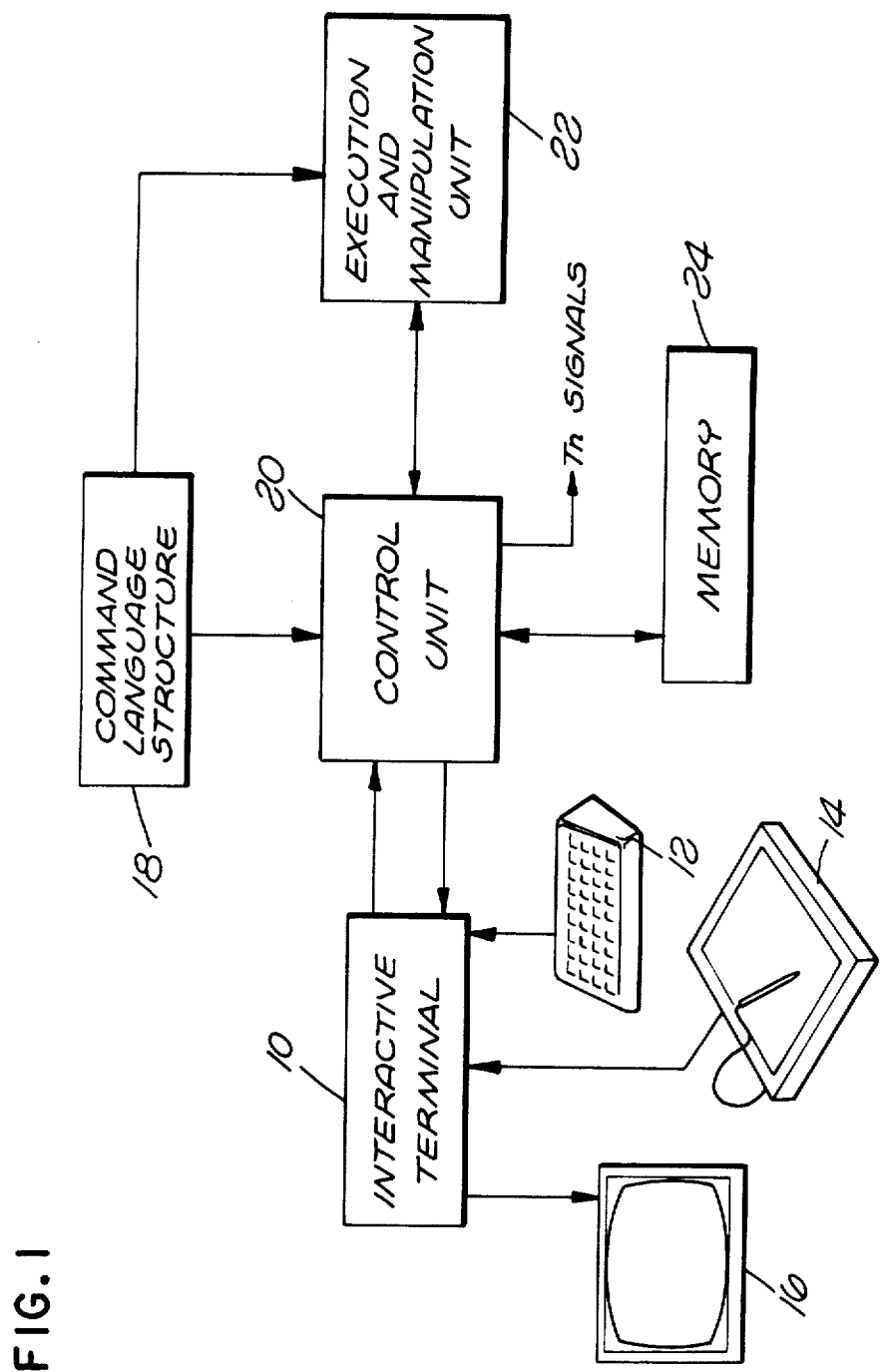
FIG. 1 is a block diagram of an interactive computer incorporating the present invention.

Referring initially to FIG. 1, an interactive terminal 10 is represented which incorporates separately illustrated communication devices. Specifically, input to the system from a user is provided by a keyboard 12 and a tablet 14. Output from the system is provided from the terminal 10 by a display device 16, traditionally in the form of a cathode ray tube apparatus. Of course, various forms of interactive terminals are well known and, accordingly, the structure illustrated in FIG. 1 is merely disclosed as exemplary. In that regard, the present invention has utility in association with computer graphics systems as disclosed in U.S. Pat. No. 3,534,338 granted Oct. 13, 1970, Christensen et al. The control unit 20, along with the command language structure 18, the execution and manipulation unit 22 and memory 24 would be embodied as special forms in a central processor, as for example represented by a block 102 in the referenced Christensen et al. patent. Essentially, as stated in that patent, the function of the central processor as related to the present development simply involves the interpretation of identifying command information for step-by-step execution of a program. See Christensen, Column 25, at lines 48-53.

The system of the Christensen patent, responds to specific commands to display a picture part, see Column 27, at lines 4–6. Identification names designate processing operations. In accordance herewith, the designation of processing operations by names is considerably simplified by an organizational format. Specifically, as indicated above, dictionaries may carry the same name which would be ambiguous, but for the position of a name in the stack or list comprising a dictionary. The system specifies that the dictionaries be scanned so that the first encounter of an ambiguous name definition is the definition to be applied.

Accordingly, by using the interactive graphics system, a program is established to accomplish the desired operation for a specific use, as the generation of a graphic display. Perhaps the operation is best explained by using a simple example.

As disclosed herein, an interactive graphics system may involve the creation of a picture on the screen of the display device 16 by selecting and arranging visual elements defined within the system under the command of the keyboard 12 and the tablet 14. To consider an exemplary operation of the system as disclosed herein with reference to the system overall of FIG. 1, assume a first command: "X Y COMPUTE DISPLAY".

Essentially, the initial desired operation involves obtaining values of X and Y from the memory (considered below), performing a certain computation on such values i.e. computing the length of a line from an origin point to the point of X and Y, then displaying the result. Of course, the command involves names which must be defined within the computer by resort to a dictionary. In that regard, the system of the present invention resorts to storage in the form of a memory stack and, as a result of the operation of the stack, is given the definitions for the names as follows:

"X": read an X-coordinate from the digitizing tablet and place it in register location R1.

"Y": read a Y-coordinate from the digitizing tablet and place it in register location R2.

"COMPUTE": compute the square root of the sum of $R1^2$ and $R2^2$ and place the results in a register location R3.

"DISPLAY": display the contents of the register R3 in the form of numerals on the display device 16.

In the operation of the system to perform the above sequence, the names used in the command are assigned the above definitions to provide specific instructions to the system for execution in compliance with the desired command. Those definitions, drawn from the dictionary stack, are then discarded by the system.

Pursuing the example, suppose that the next stage of operation involves drawing a line from a zero reference location (point of origin) of a coordinate system imposed on the display device 16, which extends from such point of origin to the point indicated by the register locations R1 and R2. The command for such an operation may take the form: "COMPUTE AND DISPLAY". Note that the command uses names similar to names used in the prior command, the definitions of which have now been discarded.

To interpret the names in the context of the present command, the system again resorts to the dictionary stack and in this instance (because the prior similar names have been discarded) the initial encounter is with the names indicate the following definitions:

"COMPUTE": create a line from 0,0 to R1,R2 and place in register location R3.

"DISPLAY": draw the line contained in register location R3.

From the above illustrative example of an operation of the system of the present invention, it can be seen that such ambiguous names as "COMPUTE" and "DISPLAY" are associatively defined by the command language structure in a dictionary stack by identification with specific definitions to resolve the ambiguity.

The system of FIG. 1 performs the operations as preliminarily indicated above by the utilization of a command language structure 18 constructed in accordance herewith and which is integrated within an interactive computer. Specifically, the command language structure 18 functions cooperatively with a program control means, or control unit 20, an execution and manipulation unit 22, and a memory 24. In general, the control unit 20 routes information signals between each of the other components of the system and provides timing signals Tn for sequencing the internal operation of the individual components.

The system as depicted in FIG. 1 is a rather generalized presentation of an interactive computer; and in that regard, a more detailed treatment is provided in the above-referenced book *Principles of Interactive Computer Graphics*. The structural and functional inter-relationship of the major elements of the system are well known as incorporated in a variety of interactive computers. However, the distinction of the present system resides primarily in the command language structure 18 and its association with the other operating components of the system.

Continuing to consider the operation of the system of FIG. 1 somewhat generally, as indicated above, communication with the system is provided directly by the keyboard 12, the tablet 14, and the display device 16 functioning in cooperation with the interactive terminal 10. Thus, a "conversation" is implemented between the system and the user.

The interactive terminal 10 communicates by electrical signals in machine language with the control unit 20 which in turn cooperatively functions with the remainder of the system. Generally, the control unit 20 pursues an operating program with detail control afforded by the user working through the interactive terminal 10. In that regard, the names of the command language are interpreted by the command language structure 18 to develop specific definitions which instruct the execution and manipulation unit 22 normally operating on data resident in the memory 24.

To consider the command language structure 18 in greater detail, along with its mode of operation, reference will now be made to FIG. 2. A multiplicty of storage stacks are depicted, specifically stacks 26 and 28 (center, left) manifesting a plurality of descriptor stacks which contain value descriptors that are associated with the definition of specific names. The stacks designated DS-1 through DS-n are physically represented in the system of FIG. 2 to designate push-down list structures; however, it is to be appreciated that alternative structures may be employed as wherein a sequence of addresses designates storage locations for the dictionary descriptors. Push-down storage stack structures (and their equivalents) are well known in the art and are widely employed in computing systems.

Figure 2:
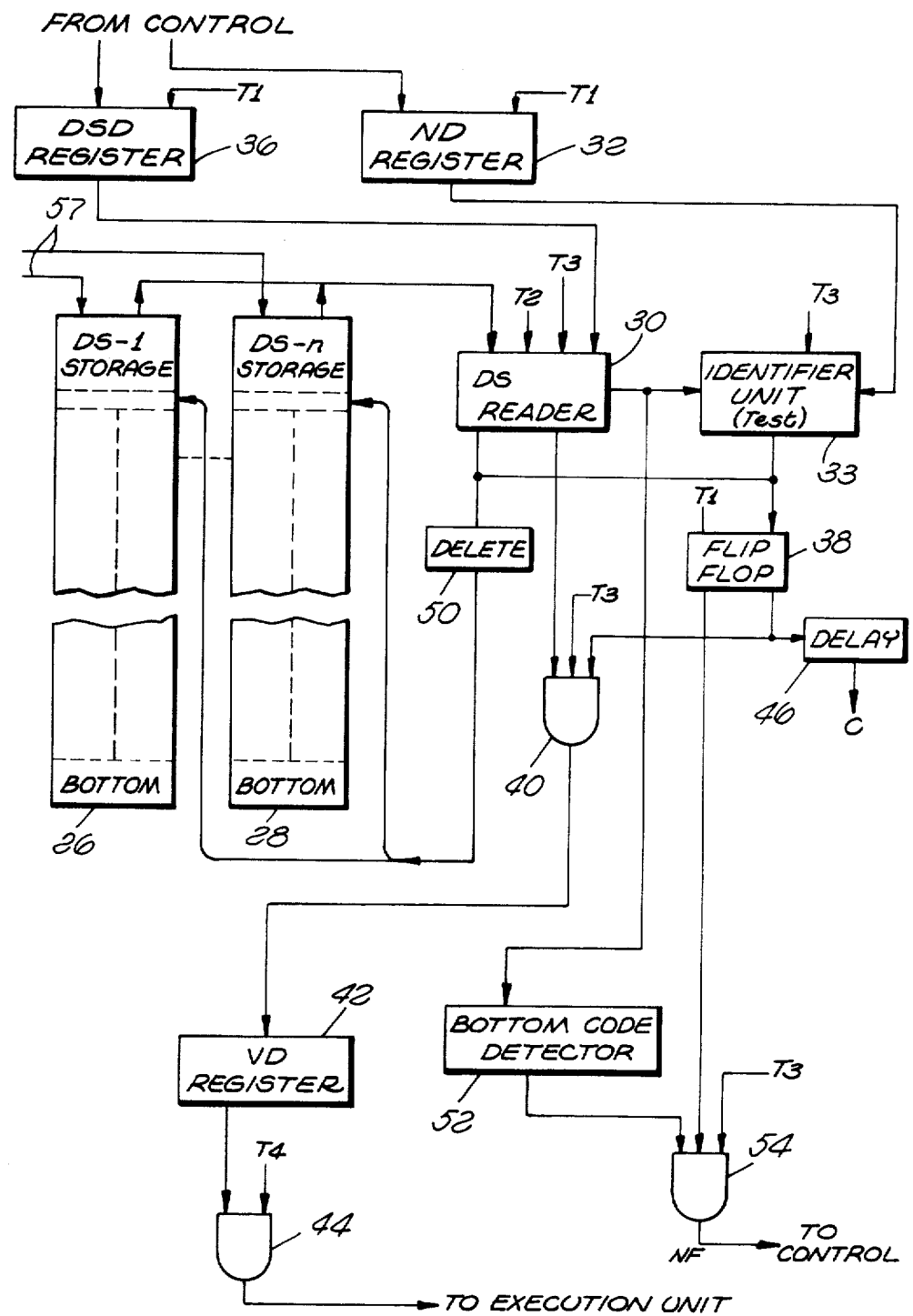
FIG. 2 is a block diagram of a portion of the system of FIG. 1 illustrating the command language structure in greater detail.

Functionally, the stacks of FIG. 2, e.g. stack 26, when designated provide dictionary descriptors (including the name and a specific definition) to a dictionary stack (DS) reader 30. That reader in turn sequentially supplies signals representative of the name for each entry in the stack to an identifier unit 33 to be tested or compared with name designator signals that are registered in a name designator (ND) register 32.

As indicated above, the basic operation of the system involves searching through a stack having a predetermined arrangement of names, to identify the definition for a name in its current context. In effect, the first occurrence of the definition for the name is set up as the current context with the consequence that the definition is utilized and deleted from the stack.

Continuing with reference to the system of FIG. 2, the specific stack to be searched (DS-1 through DS-n) is identified by signals from the control unit 20 (FIG. 1) which are placed in a dictionary stack designation (DSD) register 36 (FIG. 2). Those signals (designating the particular stack) are applied from the DSD register 36 to the DS reader 30 which selects the appropriate stack from the group DS-1 through DS-n. That stack is then searched, as a push-down list, entry by entry, for the specified name.

In the course of considering the individual dictionary descriptors from the appropriate stack, the identifier unit 33 seeks a coincidence in the name portion of the descriptors with the name in the ND register 32. Upon the occurrence of a coincidence, a pulse is provided by the identifier unit 33 to a flip-flop 38 indicating that the value descriptor of present consideration is the proper definition of the name under consideration. Accordingly, the value descriptor is represented by electrical signals which are supplied from the reader 30 through an "and" gate 40 to a value descriptor register 42 from which the value descriptor is transferred to the execution unit 22 (FIG. 1) through an "and" gate 44.

In view of the above preliminary description of the system of FIG. 2, a complete understanding thereof may now best be accomplished by assuming certain operating conditions and explaining the resulting sequences concurrently with the introduction of other components of the system. Accordingly, assume that signals representative of a dictionary stack descriptor along with signals representative of a name descriptor are supplied through the control unit 20 (FIG. 1) respectively to the registers 36 and 32 (FIG. 2) concurrently with timing signals T1 which command the registers to accept such signals. Thus, as indicated, while the register 32 contains the name of present concern, the register 36 designates the dictionary stack which is to be searched for the present context definition of that name. The system is thus prepared for the next stage of operation.

During a timing interval T2, which is provided by the control unit 20 (FIG. 1), the dictionary stack designator is supplied from the register 36 to the reader 30 to command selection of one of the storage stacks for scanning, e.g. stack 28. With the selection accomplished, the system enters the phase sequenced by the timing signal T3, during which the individual names from the stack 28 are supplied through the stack reader 30 to the identifier unit 33 for comparison with the name designator contained in the register 32. Essentially, signals from the register 32 are sequentially compared by the indentifier unit 33 with the stack entries in repetitive tests seeking a coincidence.

Assuming that a coincidence occurs as a result of the stack testing, a pulse is supplied from the identifier unit 33 to set the flip-flop 38 which was reset during the interval of signal T1. The set state of the flip-flop 38 provides a signal to the "and" gate 40 which is also qualified by the signal T3 and receives the value descriptor associated with the identified name from the storage 28. That is, the value descriptor contained along with the identified name is supplied from the storage stack 28 through the reader 30 and the "and" gate 40 to the VD register 42.

The set state of the flip-flop 38 also activates a delay 46 affording the above-described transfer of signals representative of the value descriptor from the stack 28 to the register 42. Thereafter, a completion signal C is provided by a delay signal 46 which is actuated by the setting of the flip-flop 38. The signal C is supplied to the control unit 20 (FIG. 1) to result in the timing signal T4 which concludes the sequence.

The timing signal T4 is of brief duration serving simply to qualify the "and" gate 44 for the transfer of signals representative of the value descriptor out of the register 42 to the execution unit 22 (FIG. 1).

Further to the operation, as described above, the value descriptor having been sensed from the stack 28, is now to be deleted from the stack 28 so as to access the next value descriptor for a name in the context of the next future operation. Accordingly, the signal indicating a coincidence from the identifier unit 32 is supplied to a delete circuit 50 which deletes the identified name designator and the value designator from the stack 28. That operation completes the sequence and the program proceeds with the next operation.

The above description, directed to an illustrative cycle of operations, presumed that the stack 28 contained a name designator to coincide with the assumed name designator registered in register 32. Accordingly, as described, coincidence resulted in the production of a value designator. However, it is to be appreciated that the stack may not contain a coinciding name designator. In such an event, the system simply signals the absence of coincidence. Specifically, a particular code in the storage 28 designates the bottom of the stack; and when the code is sensed, by the reader 30, a bottom code detector 52 is actuated to provide a signal to an "and" gate 54. The occurrence of such an event during the interval of the timing signal T3 (when the flip-flop 38 is reset) qualifies the "and" gate 54 to produce a signal NF (not found) which is supplied to the control unit 20 for furtherance of the program.

Thus, the system may be employed to interpret the names used in commands in accordance with the present state of operation imparting specific meaning to the context. Consequently, generic programs may be created and executed in a context appropriate to the particular stage of operation. Such programs will normally flow from the interaction between the user and the system with the consequence that as tasks become assigned for subsequent performance, the value of names associated with such tasks will simply be pushed down in storage lists or otherwise shared for use at the appropriate stage in the execution of the program. That is, the stacks DS-1 through DS-n (represented by stacks 26 and 28) are pre-loaded from the control unit 20, through lines 57 in accordance with the particular application or program which is to be performed. The utilization sequence may then involve further additions to the stacks in accommodating interaction with the user.

Of course, the system of the present invention may be variously implemented utilizing a wide range of different components and structures to accommodate the basic philosophy of operation wherein names are defined in a variety of contexts which are selectively applied based on the locations of the names in a pushdown list. Accordingly, the scope hereof is deemed to be as set forth in the claims below.

What is claimed is:

1. In an interactive computer including an interactive terminal means, memory means, program control means and execution means, an improved command language system wherein command language names are interpreted in different contexts in said program control means related to the sequence in which they are encountered, comprising:
   at least one dictionary stack for storing name-interpretation signals representative of names and of different interpretations of the names for use in program commands by said execution means;
   means controlled by said control means for sensing name-interpretation signals in a fixed predetermined sequential order from said dictionary stack;
   name means for specifying a particular name under control of said program control means;
   means for testing names of said name-interpretation signals in said predetermined sequential order with a name specified by said name means to identify the first occurrence of an association therebetween in said predetermined sequential order;
   means for supplying said name-interpretation signals identified as of said first occurrence to said execution means as a current interpretation of the particular name specified; and
   means for discarding said name-interpretation signals identified as of said first occurrence from said dictionary stack.

2. A system according to claim 1 including a plurality of dictionary stacks and further including register means for designating a particular dictionary stack for sensing.

3. A system according to claim 1 further including means for detecting the absence of name-interpretation signals associated with said name specified by said name means, for providing an advance signal to said control means.

4. A system according to claim 1 including a plurality of dictionary stacks and further including register means for designating a particular dictionary stack for sensing and further including means for detecting the absence of name-interpretation signals associated with said name specified by said name means, for providing an advance signal to said control means.

* * * * *